United States Patent

[11] 3,626,319

| [72] | Inventor | Charles Gilbert Young<br>Storrs, Conn. |
|---|---|---|
| [21] | Appl. No. | 28,199 |
| [22] | Filed | Apr. 14, 1970 |
| [45] | Patented | Dec. 7, 1971 |
| [73] | Assignee | Warner-Lambert Pharmaceutical Company<br>Morris Plains, N.J.<br>Continuation of application Ser. No. 539,041, Mar. 31, 1966, now abandoned. This application Apr. 14, 1970, Ser. No. 28,199 |

[54] LASER STRUCTURES AND THE LIKE
8 Claims, 4 Drawing Figs.

[52] U.S. Cl..................................................... 331/94.5, 313/45

[51] Int. Cl. ......................................................... H01s 3/04
[50] Field of Search............................................ 331/94.5

[56] References Cited
UNITED STATES PATENTS

| 3,162,822 | 12/1964 | Tackaberry .................. | 331/94.5 |
| 3,223,944 | 12/1965 | Luck, Jr. et al. ............. | 331/94.5 |
| 3,262,004 | 7/1966 | Keller............................ | 331/94.5 |
| 3,271,696 | 9/1966 | De Ment...................... | 331/94.5 |
| 3,399,359 | 8/1968 | Ott et al....................... | 331/94.5 |

*Primary Examiner*—John Kominski
*Attorneys*—Noble S. Williams and Albert Hultquist ABSTRACT: A solid unitary laser structure of high optical and thermal efficiency comprising elongated rod of laser glass and elongated flash tube bore completely enclosed within cladding glass of predetermined characteristics.

PATENTED DEC 7 1971 3,626,319
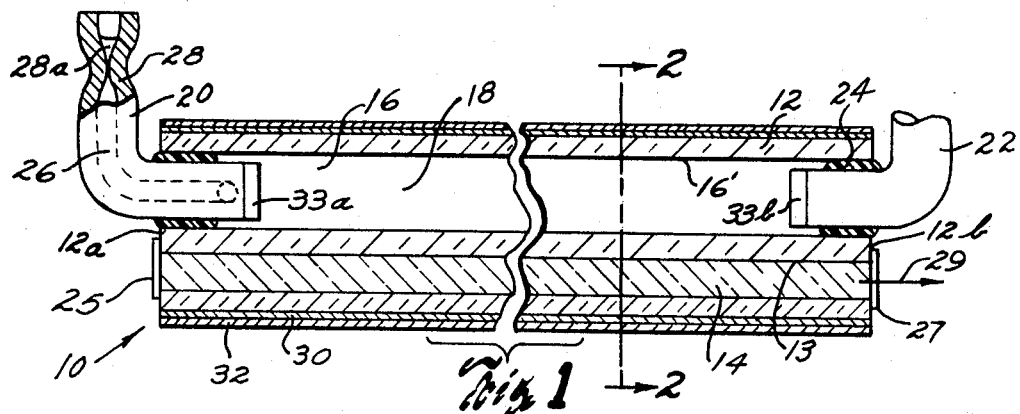
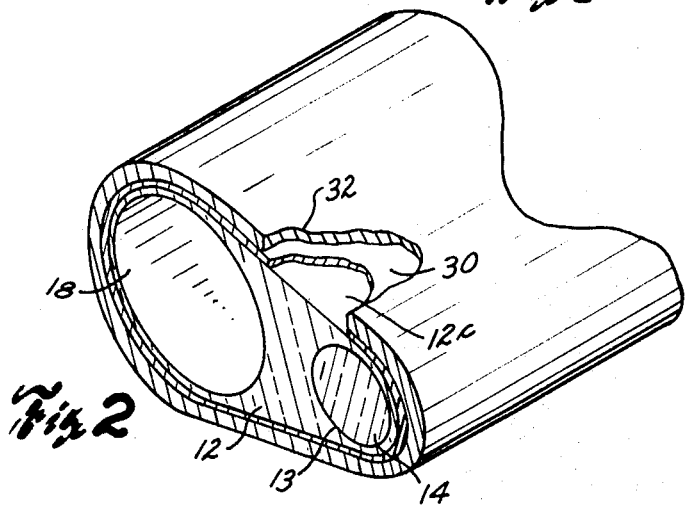
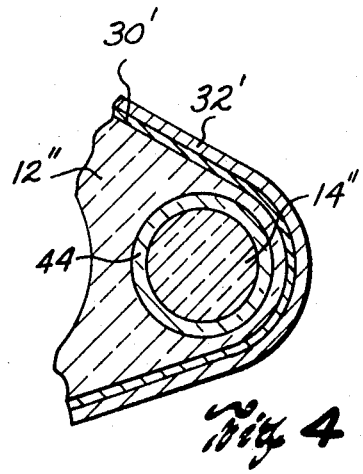
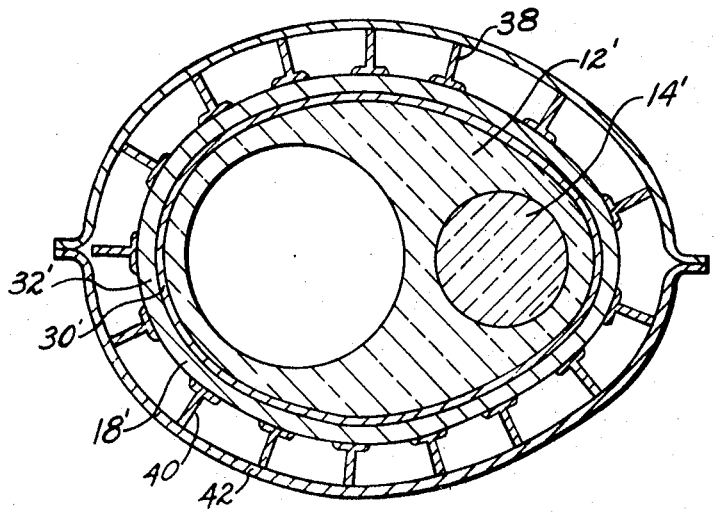
INVENTOR.
CHARLES GILBERT YOUNG
BY Noble Williams
ATTORNEY

LASER STRUCTURES AND THE LIKE

This is a continuation of application Ser. No. 539,041, now abandoned.

This invention relates to laser light-generating and laser light-amplifying assemblies, structures and the like employing thin elongated laser rods, or fibers, and associated flash tube means formed of glass and embodying improvements which enable said structures to be more economically manufactured and more efficiently operated than has been possible heretofore in otherwise comparable laser structures of earlier design.

More particularly, the invention relates to laser structures and the like comprising, in each case, a thin elongated laser rod, or fiber, and flash tube means formed into an integral unitary construction embodying improvements therein which not only render the device or structure more rugged and durable, and in such a manner that it may be manufactured more readily and economically than heretofore, but also the resulting device or assembly can be made in such long thin form, of such geometric proportions and configuration, and of such optical design as to provide therein a closer or tighter optical coupling of the component parts thereof, and a more rapid and efficient conduction and dissipation of heat to the exterior than has been possible heretofore can be accomplished; with the result that the improved structure may be more efficiently operated continuously, or discontinuously at relatively high repetition rates, and at greater laser emission output and at higher gain per unit length, relative to the input power, than have been possible in laser structures heretofore.

Additionally, in such an integral structure, the alignment of parts is permanently built into the device. Also, by the proper choice of rod and cladding materials and also as to rod and cladding indices, so as to closely match each other, a control as to mode selection and propagation can be obtained. Also, when the glass of the laser rod and the glass of the cladding therefor (and which cladding glass also forms the sidewall portions for the flash-tube portion of the assembly and thus may be suitably termed the "main body member") are properly selected for their absorptions and other related characteristics, as will be more fully explained hereinafter, energy storage and/or a self-contained or built-in Q-switching arrangement may be effected.

Laser assemblies are already known which employ relatively thin elongated laser rods or fibers formed of laser glass and disposed in adjacent side-by-side relation relative to electronic flash tubes or the like so as to be in side-pumping relation thereto, and these parts have been enclosed throughout most of their lengths by highly reflective aluminum foil, or the like, in an endeavor to direct as much of the available pumping optical energy as possible from the flash tube into the laser rod or fiber during operation thereof. Additionally, even circulating water or air between and around these laser parts has been attempted previously in efforts to try to improve the operating efficiencies of such lasers.

However, such laser assemblies and constructions of earlier design have been materially limited as to the operating efficiencies and power outputs which could be obtained and also limited as to the rapidity with which they could be pulse operated by the associated flash tube means without being damaged by the large amounts of heat generated during such laser operation.

It has now been found that by following the teachings of the present invention, laser operation at higher operating efficiencies and at materially improved repetition rates of pulsed operation, or even at continuous operation, can be obtained in a laser structure comprising a thin elongated glass laser rod, or fiber, and associated flash tube means than have been possible heretofore. The improved laser construction, in fact, is accomplished by what might be called a unitary integral, self-contained, structural arrangement wherein a thin elongated rod, or fiber, of laser glass of known kind and desired refractive index and other optical and physical characteristics is employed and contained within a main body member formed of a transparent glass of selected kind and closely related refractive index in such a way as to be in intimate contact with substantially all sidewall portions thereof, and, at the same time, an elongated bore is provided within the glass of the main body member in such closely adjacent side-by-side substantially parallel relation to said laser rod, or fiber, as to form a flash tube chamber for the pumping light source means for the laser assembly. Additionally, the thin long integrally formed flash tube and laser rod assembly is provided on its outer surface with a highly light-reflective first metallic layer and a second thicker heat-conductive metallic layer of high conductivity. The cross-sectional area of the main body member is kept as small as conveniently possible consistent with good engineering design so that not only is a close optically coupled arrangement accomplished but also so that a minimum of reflections of the flash tube light will occur before same enters the laser glass. Thus, good radial heat conductivity from the flash-tube chamber through glass only will be provided and rapid heat removal from the structure will be obtained. Even the cross-sectional shape of the body can be controlled so as to better reflect the flash tube light toward the laser rod. Furthermore, since the laser rod, or fiber, and the main body material are both of glass, the assembly can be made relatively long and thin for better operating efficiencies. Also the main body material may be mechanically strengthened by the metallic first and second layers or coatings.

It is, accordingly, an object of the present invention to provide a unitary integral thin elongated laser system comprising a main body member formed of glass which is transparent to optical energy of predetermined pumping wavelengths and of a known refractive index, a thin elongated rod, or fiber, of laser glass of a closely matching refractive index embedded within said main body member and extending substantially from end to end thereof, a bore formed within said main body member and extending the greater part of the length thereof in closely adjacent substantially parallel relation to said rod or fiber, said bore being closed at its opposite ends and containing an ionizable gas therein, a pair of electrodes carried by said main body member and extending into said bore adjacent the opposite ends thereof so as to form a flash tube chamber therein, and a layer of highly reflective metallic material disposed upon the outer sidewall portions of said main body member and in intimate contact therewith so as to reflect pumping optical energy produced within said bore toward said laser rod, or fiber, while also rapidly conducting heat generated within said structure to the exterior thereof; whereby said laser system will be provided a close optical coupling and an efficient radial conduction cooling arrangement.

It is also an object of the present invention to provide for such a thin elongated unitary, integral laser system an elliptical or approximately elliptical outer cross-sectional configuration for the main body member; whereby a more efficient concentration of the pumping light rays onto the laser rod or fiber, while providing a minimum of internal reflection and an efficient dissipation of the heat generated during laser operation, will be effected.

It is also an object of the invention to provide such a thin elongated close-coupled laser structure with reflective surface coatings upon the opposite end walls of the laser rod or fiber portion thereof, whereby an optical resonant cavity will be formed between said coated end wall surfaces and laser action at a materially reduced amount of input power may be produced and continuously maintained, or maintained at a relatively rapid pulse repetition rate.

It is also an object of the present invention to provide upon the outer reflective first layer on said thin elongated main body member of the laser structure or system, and in intimate contact with said first layer, a relatively thick second layer of metal of a relatively high heat conductivity so as to provide an efficient means for the dissipation of heat being generated by the laser system during the operation thereof.

Other objects and advantages of the present invention will become apparent from the detailed description which follows when taken in conjunction with the accompanying drawings wherein:

FIG. 1 is a longitudinal section view of a laser assembly or structure embodying the present invention;

FIG. 2 is an enlarged perspective and partly broken-away view showing a part of the structure of FIG. 1 including a cross section taken substantially upon section line 2—2 thereof;

FIG. 3 is an enlarged cross-sectional view showing a modified form of the invention; and, FIG. 4 is a fragmentary cross-sectional view showing a further modification of the invention.

Referring to the drawings in detail and in particular to FIG. 1, it will be seen that numeral 10 indicates generally a laser assembly or construction of minimum bulk and weight and comprising a thin elongated main body member 12 which is formed of glass of such optical and physical characteristics as to be compatible with the laser glass to be used therewith and transparent to optical energy of at least certain preselected pumping wavelengths which are needed for side pumping and energizing the laser glass being employed therewith.

Within this member 12 and extending throughout the length thereof is a rod, or fiber, 14 formed of a laser glass of known kind, such as trivalent neodymium-doped barium crown laser glass, an erbium-ytterbium-neodymium-doped laser glass, an ytterbium-neodymium-doped laser glass, or the like, and of a predetermined refractive index value. Note that the refractive index value of the glass of the main body member 12 will be carefully considered and controlled relative to that of the laser glass to be used therewith so as to have at an interface 13 between the laser glass and the main body member a refractive index difference of desired value.

In certain cases, the refractive index of the laser glass will be appreciably greater than that desired for the main body member serving as a surrounding cladding therefor. This will be when mode selection and propagation are not material factors. However, at other times, it may be preferable for certain purposes, such as for allowing only lower order mode propagation within the laser rod, to have this cladding glass of only a slightly lesser refractive index value than that of the laser glass. At such times, only lower order modes will propagate. A core-to-cladding index difference of only one or two parts in a thousand is easily obtainable and a beam spread from the laser or fiber will be limited to no more than 3° or thereabouts. Also, at still other times and for other purposes, as will be presently described, a slightly greater refractive index value of the cladding material relative to the laser glass may be desired and provided.

Also contained within the main body member 12, and extending in the longitudinal direction thereof in such manner as to be closely adjacent and in side-by-side substantially parallel relation to the laser rod, or fiber, 14 is a hollow cylindrical bore 16. The bore 16 is provided with a highly polished cylindrically shaped interior surface 16' and is closed at its opposite ends by suitable means so as to form a gastight chamber 18 within which an ionizable gas, or mixture of gases, such as xenon, argon, helium and the like are contained.

The ends of the bore 16 in the instant disclosure are closed by electrodes 20 and 22 which extend into the bore and are fixedly secured therein as by an epoxy cement or the like 24. Before the insertion of the electrodes, the opposite end surfaces 12a and 12b of the main body member and of the laser rod, or fiber, are polished, and upon these polished end surfaces are disposed one or a pair of coatings or layers 25 and 27, as desired.

In one construction, they may be, in known fashion, formed of highly reflective metallic material, or of dichroic materials which are highly reflective to optical energy at certain predetermined laser emission wavelength or wavelengths. This will be when an optical resonant cavity structure for laser light-generating purposes or the like is desired. In such cases, of course, at least one of the layers or coatings will be such as to allow a small percentage transmission so that optical energy at the selected emission wavelength may pass outwardly therethrough, as indicated by arrow 29.

In slightly different laser arrangements, such as in the bistable laser construction disclosed in copending Koester application Ser. No. 375,041, filed June 15, 1964, now U.S. Pat. No. 3,440,562 also in the solarizable absorber laser apparatus disclosed in copending Shiner application Ser. No. 505,893, filed Nov. 1, 1965, and also in the Q-switching laser construction disclosed in copending Koester application Ser. No. 212,909, filed July 27, 1962, now U.S. Pat. No. 3,286,193 one or both of these highly reflective surfaces can be arranged in spaced aligned and properly oriented relation relative to the end, or ends, of the laser rod, or fiber; whereby it will be possible to employ suitable filter or mechanical means between such spaced reflector and the adjacent end of the laser member.

If the laser structure of FIG. 1 is to be used for laser light-amplifying purposes, the end coatings 25 and 27 could be formed, instead and in known fashion, by a multilayer low reflection coating so that a light signal, for example, may be efficiently directed into the laser rod, or fiber, through one end thereof and the amplified laser light signal allowed to pass readily outwardly through the opposite end thereof. At the same time, no more than a minimum of internal reflection of light, which might otherwise tend to reduce the amount of amplification gain obtainable, will be allowed to occur at these end surfaces.

One of the electrodes 20, as shown in FIG. 1, has formed therein a longitudinal passageway 26 which communicates with the interior of the bore 18 through a small side opening 26a. Thus, after the electrodes have been cemented or otherwise secured in place, the chamber 18 may be evacuated through this passageway while also being cleansed by means of a high-intensity electric discharge between the ends of the spaced electrodes 20 and 22. Thereafter xenon or other ionizable gas or gases will be injected into chamber 18 after which passageway 26 may be closed off tightly as by a "pinching-in" of the sidewalls thereof and sealing with an epoxy cement, as indicated at 28 and 28a, if necessary. These electrodes may be formed of copper tubing for good heat conductivity and may be tipped at their inner ends by tungsten caps 33a and 33b, if desired, so that they will better withstand the heat and other operating conditions during continuous or high repetition rate pulse operation of the device. Series triggering of the flash tube can be accomplished through one of the electrodes.

In FIG. 2, it will be seen that upon the outer highly polished sidewall portions 12c of the thin elongated main body member 12 is disposed a first coating or layer 30 of highly reflective metallic material, preferably silver, since same has better light reflectivity in the near infrared part of the spectrum than other metals such as aluminum, and upon the outer surface of this layer or coating 30 is deposited a somewhat heavier metallic second coating or layer 32 of high-heat-conductivity material such as copper, or the like.

In FIG. 2, wherein a cross section of one preferred form of thin elongated unitary integral structure appears, a rather close optical coupling for the flash tube chamber 18 and the laser rod, or fiber, adjacent thereto is accomplished. A workable size for a continuously operated, or rapidly pulse-operated fiber laser assembly of this kind, and having high operating efficiencies with good radial heat dissipation, would be in the neighborhood of 10 inches or so in length, and the laser rod or fiber portion thereof would be in the neighborhood of 1 millimeter in diameter. Also, the flash tube bore would be approximately 2 millimeters in diameter.

In such a construction using the trivalent neodymium four-level laser glass, a laser output of $10^6$ watts at 1.06-micron wavelength in a 50-millijoule pulse at 10 pulses per second at room temperature for extended periods of operation are possible without fluid cooling. High efficiency above threshold will be obtained in this four-level system with low end reflectivity and a consequent relatively high gain, since a long laser rod or fiber necessitates less gain per unit length and, therefore, less inversion per unit volume, same also being easier to cool rapidly. Good results can be obtained when other dimensional values are used.

In such an arrangement, the laser glass will be in intimate contact with the glass forming the main body member and the latter's volume will be kept as small as conveniently possible. Thus, in the main, the light, upon leaving the interior of the flash tube, will travel through glass (rather than through any combination of glass, then air, and then glass as previously) with the result that the light will more quickly encounter the laser glass and be absorbed. This will be instead of being allowed to rattle around inside the structure for a protracted period and suffer unavoidable silver reflection losses at each encounter with the surrounding reflector as well as high thermal interfacial losses. A more rapid removal of heat will be possible.

Not only will the metallic coatings upon the outside of the main body member aid in the dissipation of the heat being generated during operation of the device but also additional mechanical strength will be added to this relatively thin long otherwise fragile structure. The silver of the first reflective coating will be protected on its outer side by the heavy copper second coating thereon. Also, when the main body member 12 is formed of a glass having an ultraviolet absorption, the inner surface of the silver coating will also be protected thereby.

As shown in FIG. 3, the main body member 12' may be controlled as to its outer surface cross-sectional shape so that an ellipse, or modified ellipse, will be formed with the laser rod, or fiber 14' being disposed near one of its major points and the flash tube chamber 18' near the other. Thus, they will be positioned so as to more efficiently receive light reflected from the various parts of the silver first coating outer surface of the main body member. The second coating of copper is shown at 32'. Also, as indicated, a plurality of radially extending cooling fins 38 of metal of good heat conductivity may be disposed and secured by soldering, brazing or the like upon the outer surface of the layer 32'. These may be shaped and made in sections so as to fit and extend transversely of the structure or may be made straight and in such a manner as to run lengthwise thereof, and fins of the latter type are indicated at 40. Thus, additional exterior surface areas for dissipating heat from the laser structure are provided thereby. If, at times, an even greater amount of cooling effect is desired for such a laser structure or assembly, it would also be possible to provide an outer two-part enclosing jacket, such as indicated at 42, which would extend the greater part of the length of the structure and through which a coolant such as air or water may be pumped.

The laser rod, or fiber, of the improved assembly may be, for certain purposes, clad with a glass of special kind and controlled thickness in order that same will be disposed intermediate the laser material and the glass of the surrounding main body member. Such an arrangement is shown in FIG. 4 wherein an intermediate cladding of special glass is indicated at 44. As shown, this glass of part 44 is in intimate contact with both the glass of the main body member 12" and of the laser rod 14".

For example, the laser glass of part 14" could be formed of the trivalent neodymium-doped barium crown type already mentioned and could have a relatively high predetermined refractive index. The cladding glass 44 could be saturable absorber-doped glass of only a very slightly higher refractive index and containing a dopent of a kind disclosed in copending Snitzer application Ser. No. 375,036, filed June 15, 1964, now abandoned. In this application, the following bivalent dopent ions in a host glass have been mentioned: nickel, cobalt, copper and iron; the following trivalent dopent ions in glass have been mentioned: vanadium, samarium, dysprosium, praseodymium, europium, terbium, holmium, gadolinium and thulium, and also the tetravalent dopent ions of uranium. The main body member could be formed of a glass of a somewhat lower refractive index clear glass, or an ultraviolet absorbing glass as mentioned earlier.

In a copending Koester et al. application Ser. No. 299, 794, filed Aug. 5, 1963 now U.S. Pat. No. 3,445,785 a laser structure using absorbing glass claddings which are not necessarily saturable absorbers has been disclosed. Such absorbing glass claddings, including samarium, dysprosium and ferrous iron glasses, serve the useful purpose of absorbing off-axis laser emission and thereby increase the allowable population inversion of the laser structure.

While the first layer 30, or 30', of highly reflective heat-conductive material in intimate contact with the sidewall portions of the main body member 12, 12', or 12" will provide the most efficient operating arrangement for the laser structure, it will be possible at times to employ instead a surrounding layer of such material arranged in closely fitting relation to the sidewall portions of said main body member and still obtain improved results. Of course, the second layer 32 or 32' could then be disposed, if desired, about this first layer.

Since, as pointed out previously, the volume of the main body member will be kept to a minimum relative to the size of the rod and bore to be used therewith, it follows that the cross-sectional area of the glass of the main body member will be maintained as small as conveniently possible relative to the cross-sectional areas of the associated laser rod and of the associated bore, and a ratio as small as 3 to 1 and even as low as 2 to 1, is possible.

I claim:

1. An integral solid laser structure comprising a thin elongated laser component formed of glass containing an active laserable ingredient, a thin elongated main body member surrounding said laser component throughout the length thereof and formed of a glass transparent to optical energy of a predetermined pumping wavelength band for said laserable ingredient, said laser component having smooth sidewall portions extending throughout the length thereof and disposed within said main body member so as to have all parts of said sidewall portions in fused integral relation with said main body member throughout the length thereof, the glass of said main body member and the glass of said laser component having such related refractive indices as to jointly provide no more than a very small predetermined refractive index difference at the interface therebetween, pumping light source means comprising at least an elongated smooth-sided flash tube bore formed within said main body member closely adjacent said laser component and extending in substantially parallel relation to said component throughout the greater part of the length of said main body member, means closing said flash tube bore at its opposite ends and said bore being filled with an ionizable gas, a pair of electrodes carried by said main body member adjacent said opposite ends and extending into said bore, said laser component having flat optically finished surfaces formed upon the opposite ends thereof and disposed in parallel relation to each other, a relatively thin layer of highly light-reflective heat-conductive material encircling said main body member throughout the greater part of the length thereof and disposed in intimate contacting relation with the exterior sidewall portions of said main body member, the peripheral shape of said exterior sidewall portions of said main body member and of said thin reflective layer thereon being such as to tend to reflect most of the pumping light generated within said flash tube bore during operation thereof toward said laser component.

2. A laser structure as defined in claim 1 wherein the cross-sectional area of the glass of said main body member is reduced to a substantial minimum considered in comparison with the cross-sectional area of said laser component and said flash tube bore and the total cross-sectional area of the glass of the main body member is no more than approximately three times the cross-sectional area of said bore and said laser component combined.

3. A laser structure as defined in claim 2 wherein the main body member at substantially all transverse sections thereof is approximately of the shape of an ellipse.

4. A laser structure as defined in claim 1, comprising a second layer of heat-conductive material of greater thickness than said first layer disposed about the outer surface of said first layer throughout the greater part of the length thereof and in intimate contacting relation therewith.

5. A laser structure as defined in claim 1 wherein said laser component is formed of a core of laser glass embodying a laserable ingredient therein and is surrounded by a cladding of glass containing a laser light-absorbing ingredient therein.

6. A laser structure as defined in claim 4, and including a plurality of metal fins disposed in contacting relation to outer surface portions of said second layer and extending outwardly therefrom in such a manner as to aid in the dissipation of heat from said structure.

7. A laser structure as defined in claim 6, and including a wall surrounding said plurality of metal fins so as to define a plurality of guide channels for a circulated coolant when used with said laser structure.

8. An integral solid laser structure comprising a thin elongated laser component formed of glass containing an active laserable ingredient, a thin elongated main body member surrounding said laser component throughout the length thereof and formed of a glass transparent to optical energy of a predetermined pumping wavelength band for said laserable ingredient, said laser component having relatively smooth sidewall portions extending throughout the length thereof and disposed within said main body member so as to have all parts of said sidewall portions in fused integral relation with said main body member throughout the length thereof, pumping light source means comprising at least an elongated smooth-sided flash tube bore formed within said main body member closely adjacent said laser component and extending in substantially parallel relation to said component throughout the greater part of the length of said main body member, means closing said flash tube bore at its opposite ends and said bore being filled with an ionizable gas, a pair of electrodes carried by said body member adjacent said opposite ends and extending into said bore, optically finished surfaces formed upon the opposite ends of said laser component, at least one of said end surfaces having a relatively thin coating of material of such transmissive characteristics as to allow optical energy at the emission wavelength of said laser material to pass therethrough, a relatively thin layer of highly light-reflective heat-conductive material encircling said main body member throughout the greater part of the length thereof and disposed in intimate contacting relation with the exterior sidewall portions of said main body member, the peripheral shape of said exterior sidewall portions of said main body member and of said thin reflective layer thereon being such as to tend to reflect most of the pumping light generated within said flash tube bore during operation thereof toward said laser component.

* * * * *